United States Patent [19]

Flament

[11] 3,881,025

[45] Apr. 29, 1975

[54] AROMATIC COMPOSITIONS

[75] Inventor: Ivon Flament, Geneva, Switzerland

[73] Assignee: Firmenich S.A., Geneva, Switzerland

[22] Filed: Mar. 6, 1972

[21] Appl. No.: 232,279

[30] Foreign Application Priority Data
Mar. 9, 1971 Switzerland.......................... 3396/71

[52] U.S. Cl. .................. 426/537; 131/17; 131/144; 260/250 R; 260/306.7; 260/586; 424/358
[51] Int. Cl. .......................... A23l 1/26; A24b 15/00
[58] Field of Search............ 99/140 R; 260/250, 586; 131/17, 144; 426/175

[56] References Cited
UNITED STATES PATENTS

| | | |
|---|---|---|
| 3,268,589 | 8/1966 | Rowland ........................... 99/140 R |
| 3,328,402 | 6/1967 | Winter .................................. 260/250 |
| 3,380,456 | 4/1968 | Roberts............................. 99/140 R |
| 3,529,064 | 9/1970 | Jansen......................... 260/586 R X |
| 3,559,656 | 2/1971 | Heckman ......................... 260/586 R |
| 3,579,353 | 5/1971 | Nakel................................. 99/140 R |
| 3,617,310 | 11/1971 | Rizzi .................................. 99/140 R |
| 3,622,346 | 11/1971 | Winter .............................. 99/140 R |
| 3,681,088 | 8/1972 | Katz................................... 99/140 R |

FOREIGN PATENTS OR APPLICATIONS
1,156,484    6/1969    United Kingdom

*Primary Examiner*—Morris O. Wolk
*Assistant Examiner*—Sidney Marantz
*Attorney, Agent, or Firm*—Pennie & Edmonds

[57] ABSTRACT

Process for flavoring foodstuffs, beverages, pharmaceuticals and tobacco products with particular cyclohexen-2-ones alone or with particular pyrazines and/or with particular thiazolidines.

16 Claims, No Drawings

AROMATIC COMPOSITIONS

BACKGROUND OF THE INVENTION

The invention relates to compositions and a process for improving, enhancing or modifying the flavouring properties of foodstuffs, feedstuffs, beverages, pharmaceutical preparation and tobacco products. The invention relates further to food products to which there are added compositions comprising at least one compound, pyrazine or a pyraizine derivative, of the formula

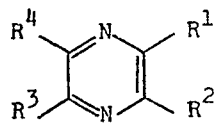

I wherein the substituents $R^1$, $R^2$, $R^3$ and $R^4$ may be the same or different and either each represents a hydrogen atom, or a saturated or unsaturated, cyclic or acyclic, linear or branched hydrocarbon radical, or $R^3$ together with $R^4$ may constitute a benzene ring, or one of them represents an acyl radical and each of the other a radical of the same type as those mentioned above, and a. at least one compound of formula

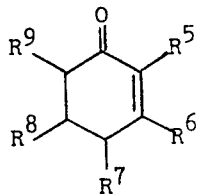

II wherein the substituents $R^5$, $R^6$, $R^7$, $R^8$ and $R^9$ may be the same or different and each represents a hydrogen atom, or a saturated or unsaturated, cyclic or acyclic, linear or branched hydrocarbon radical, and/or b. at least one compound of formula

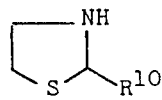

III wherein $R^{10}$ represents a hydrogen atom, or a hydrocarbon radical as indicated sub(a), or an aromatic or araliphatic hydrocarbon radical.

Many of the compounds belonging to the classes described hereinabove are known, as are methods of their preparation. In respect to many pyrazine derivatives, for instance, their preparation, their nautral occcurance and their use in the field of flavour industry have been described in seveal scientific publications and in the patent literaure. See, for example, U.S. Pat. No. 1,696,419; Helv. Chim. Acta, 47, 1581 (1964); Nature, 210, 1358 (1966); Helv. Chim. Acta, 48, 1809 (1965German Offen. 1,695,505; British Pat. Nos. 1,156,472 and 1,156,484; U.S. Pat. No. 3,459,556. However, none of the cited references disclosed the specific combination of said pyrazine or pyrazine derivatives with the compounds having formula II and or III.

The compounds of formula II, the cyclohexenone derivatives, constitute a well known class of chemical compounds the synethesis of which has been thoroughly studied in the past and described in, e.g., J. Chem. Soc. 1944, 430; J.Am.Chem. Soc. 71, 2028 (1949); J.Org.Chem., 21, 612 (1956). These references, however, do not show the addition of cyclohexenone derivatives to food products, nor do they suggest any possible application of said compounds for flavouring purposes.

Equally, the compounds of formula III, many of which are described for the first time in our present application, have not been previously recognized as useful flavour additives.

DESCRIPTION OF THE INVENTION

It has now been surprisingly found that by adding to food- or feedstuffs, beverages, pharamaceutical preparations and tobacco products, a composition comprising at least one compound of formula

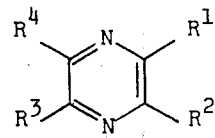

I wherein the substituents $R^1$, $R^2$, $R^3$ and $R^4$ may be the same or different and either each represents a hydrogen atom, or a saturated or unsaturated, cyclic or acyclic, linear or branched hydrocarbon radical, or $R^3$ together with $R^4$ may constitute a benzene ring, or one of them represents an acyl radical and each of the other a radical of the same type as those mentioned above and a. at least one compound of formula

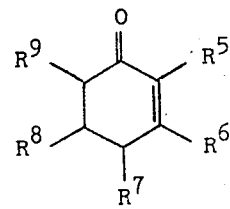

II wherein the substituents $R^5$, $R^6$, $R^7$, $R^8$ and $R^9$ may be the same or different and each represents a hydrogen atom, or a saturated or unsaturated, cyclic or acyclic, linear or branched hydrocarbon radical, and/or b. at least one compound of formula

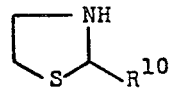

III wherein $R^{10}$ reprsents a represents atom, or a hydrocarbon radical as indicated sub (a), or an aromatic or araliphatic hydrocarbon radical, the organoleptic properties of said materials were improved, enhanced or modified.

Quite unexpectedly, by the combination of the presently disclosed flavour ingredients the effect observed was qualitatively and quantitatively diffeent from that which could be different by the sum of the specific organoleptic characters of the ingredients taken separately. A synergistic effect was in fact observed.

Further, it has been found that many of the mentioned ingredients, specifically those belonging to the classes of compounds defined by general formulae II and III, posses useful flavouring properties even when taken separately.

It is a present object of the presnt invention to disclose a process for improving, enhancing or modifying the organoleptic properties of food- and feedstuffs, beverage, pharmaceutical preparation and tobacco, which comprises adding to said materials at least one of the compounds having formula II and/or at least one of the compounds having formula III.

Depending upon the nature of the other constitutents of the flavouring compositions, their proportion and, more specifically, upon the nature of the products to which the compounds or compositions of the present invention are added, said compounds or compositions develop or enhance flavour notes of various nature.

For instance, they can develop notes such as the roasted, burned or earthly ones, or simply they can impart to the products to which they are added a more defined taste of meat, cereals, hazel-nuts nuts or cocoa. Typically, they impart a roasted or burned note and, as a consequence, they find a particular utility for modifying or favourably enhancing the organoleptic character of certain flavouring compositions such as those possessing a nut, hazel-nut, pistachio, cocoa, coffee, caramel, roasted cereals, meat or spicy character.

Depending upon the desired effect, the mentioned compounds or compositions may be used in isolated form or in combination with various amounts of other flavouring ingredients, carriers or diluents.

The proportions of the compounds of formula I, II or III, or composition thereof to be used in accordance with our present invention can vary within wide limits. For example, amounts as low as about 0.1 ppm (parts per million), based on the total weight of the flavoured material, have been found to be effective in many cases. Usually, however, depending on the nature of the product to be flavoured, it is desirable to add at least 1 to about 10 ppm of the flavouring ingredients.

In order to achieve special effects the hereinabove given upper limits can be raised to 100 ppm or even higher.

In all cases, the ranges of proportions indicated may be varied depending upon the specific flavoring effect it is desired to achieve.

In the following description there is given a nonexhaustive list of the compounds belonging to the chemical groups defined by general formulae I, II and III. Immediately following the chemical name of each of the members of the selected group there is given the commercial source of a literature reference giving a method for its preparation. Commercially available products will be identified by the abbreviation c.a., and may be obtained, for example, from FLUKA AG., Buchs, S.G., Switzerland.

In those instances wherein new compounds are described a detailed method of preparation is given following the list of the group members. The new compounds will be identified by the abbreviation n.c.

The results of the organoleptic evaluation tests are set out in the examples following the detailed description of the groups of compounds.

A. Pyrazines

In this first group there are included the compounds having the general formula I.

| I. | | | Pyrazines having saturated side chain(s) | |
|---|---|---|---|---|
| $C_0$ | | | | |
| | | 1. | pyrazine | c.a. |
| $C_1$ | | | | |
| | | 2. | methylpyrazine | c.a. |
| $C_2$ | | | | |
| | | 3. | 2,3-dimethylpyrazine | Ber. 40, 4855 (1907) |
| | | 4. | 2,5-dimethylpyrazine | c.a. |
| | | 5. | 3,5-dimethylpyrazine | c.a. |
| | | 6. | ethylpyrazine | J. Org. Chem.,26, 3379 (1961) |
| $C_3$ | | | | |
| | | 7. | trimethylpyrazine | J.Am.Chem.Soc.,72, 844 (1950) |
| | | 8. | 2-methyl-3-ethyl-pyrazine | * |
| | | 9. | 2-methyl-5-ethyl-pyrazine | * |
| | | 10. | 2-methyl-6-ethyl-pyrazine | * |
| | | 11. | 2-n-propyl-pyrazine | J.Org.Chem.,26, 3379 (1961) |
| | | 12. | 2-isopropyl-pyrazine | J.Org.Chem.,26, 3379 (1961) |
| $C_4$ | | | | |
| | | 13. | tetramethylpyrazine | |
| | | 14. | 2,6-dimethyl-3-ethyl-pyrazine | * |
| | | 15. | 2,5-dimethyl-3-ethyl-pyrazine | * |
| | | 16. | 2,3-dimethyl-5-ethyl-pyrazine | n.c. |
| | | 17. | 2,3-diethyl-pyrazine | * |
| | | 18. | 2,5-diethyl-pyrazine | * |
| | | 19. | 2,6-diethyl-pyrazine | * |
| | | 20. | 2-methyl-3-propyl-pyrazine | * |
| | | 21. | 2-methyl-5-propyl-pyrazine | n.c. |
| | | 22. | 2-methyl-6-propyl-pyrazine | J.Org.Chem.,27, 1355 (1962) |
| | | 23. | 2-methyl-3-isopropyl-pyrazine | * |
| | | 24. | 2-methyl-5-isopropyl-pyrazine | * |
| | | 25. | 2-methyl-6-isopropyl-pyrazine | n.c. |
| | | 26. | butyl-pyrazine | n.c. |
| | | 27. | isobutyl-pyrazine | n.c. |
| | | 28. | [1'-methyl-propyl]-pyrazine | n.c. |
| | | 29. | tert.-butyl-pyrazine | n.c. |
| $C_5$ | | | | |
| | | 30. | 2,3,6-trimethyl-5-ethyl-pyrazine | * |
| | | 31. | 2-methyl-3-butyl-pyrazine | |
| | | 32. | 2-methyl-5-butyl-pyrazine | n.c. |
| | | 33. | 2-methyl-6-butyl-pyrazine | n.c. |
| | | 34. | 2-methyl-3-isobutyl-pyrazine | * |
| | | 35. | 2-methyl-5-isobutyl-pyrazine | n.c. |
| | | 36. | 2-methyl-6-isobutyl-pyrazine | n.c. |
| | | 37. | 2-methyl-3-[1'-methyl-propyl]-pyrazine | n.c. |

I. Pyrazines having saturated side chain(s) — Continued

|     |     |     |     |
| --- | --- | --- | --- |
|     | 38. | 2-methyl-5-[1'-methyl-propyl]-pyrazine | n.c. |
|     | 39. | 2-methyl-6-[1'-methyl-propyl]-pyrazine | n.c. |
|     | 40. | 2-methyl-3-tert.-butyl-pyrazine | n.c. |
|     | 41. | 2-methyl-5-tert.-butyl-pyrazine | n.c. |
|     | 42. | 2-methyl-6-tert.-butyl-pyrazine | n.c. |
|     | 43. | 2-ethyl-3-propyl-pyrazine | n.c. |
|     | 44. | 2-ethyl-5-propyl-pyrazine | n.c. |
|     | 45. | 2-ethyl-6-propyl-pyrazine | n.c. |
|     | 46. | 2-ethyl-3-isopropyl-pyrazine | n.c. |
|     | 47. | 2-ethyl-5-isopropyl-pyrazine | n.c. |
|     | 48. | 2-ethyl-6-isopropyl-pyrazine | n.c. |
|     | 49. | 2,6-dimethyl-3-isopropyl-pyrazine | n.c. |
|     | 50. | 2,5-dimethyl-3-isopropyl-pyrazine | n.c. |
|     | 51. | 2,3-dimethyl-5-isopropyl-pyrazine | n.c. |
|     | 52. | 2-methyl-3,5-diethyl-pyrazine | * |
|     | 53. | 2-methyl-3,6-diethyl-pyrazine | * |
|     | 54. | 2-methyl-5,6-diethyl-pyrazine | * |
|     | 55. | 2,6-dimethyl-3-propyl-pyrazine | n.c. |
|     | 56. | 2,5-dimethyl-3-propyl-pyrazine | n.c. |
|     | 57. | 2,3-dimethyl-5-propyl-pyrazine | n.c. |
|     | 58. | amyl-pyrazine | n.c. |
|     | 59. | isoamyl-pyrazine | n.c. |
|     | 60. | [2'-methyl-butyl]-pyrazine | n.c. |
|     | 61. | [1'-methyl-butyl]-pyrazine | n.c. |
|     | 62. | [1',2'-dimethyl-propyl]-pyrazine | n.c. |
|     | 63. | [1'-ethyl-propyl]-pyrazine | n.c. |
|     | 64. | [2'-dimethyl-propyl]-pyrazine | n.c. |
|     | 65. | [1',1'-dimethyl-propyl]-pyrazine | n.c. |
| $C_6$ | 66. | 2-methyl-3-amyl-pyrazine | * |
|     | 67. | 2,5-dimethyl-3,6-diethyl-pyrazine | * |
|     | 68. | 2,5-dimethyl-3-butyl-pyrazine | * |
| $C_7$ | 69. | 2,3-dimethyl-5-isoamyl-pyrazine | * |
|     | 70. | 2-methyl-3-hexyl-pyrazine | * |
|     | 71. | 2,5-dimethyl-3-isoamyl-pyrazine | * |
|     | 72. | trimethyl-butyl-pyrazine | * |
| $C_8$ | 73. | trimethyl-isoamyl-pyrazine | * |
|     | 74. | 2,5-dimethyl-3,6-diisopropyl-pyrazine | * |
|     | 75. | 2,5-dimethyl-3,6-dipropyl-pyrazine | * |
| $C_9$ | 76. | 2,3,5-trimethyl-6-hexyl-pyrazine | * |
| $C_{10}$ | 77. | 2,5-dimethyl-3,6-dibutyl-pyrazine | * |
|     | 78. | 2,5-dimethyl-3,6-diisobutyl-pyrazine | * |
| $C_{12}$ | 79. | 2,5-dimethyl-3,6-diamyl-pyrazine | * |
| $C_{14}$ | 80. | 2,5-dimethyl-3,6-dihexyl-pyrazine | * |

*Spanish patent 326,503
**British patent 1,220,816

II. Pyrazines having unsaturated side chain(s)

|     |     |     |
| --- | --- | --- |
| 81. | 5-methyl-quinoxaline | Ann.,237, 336 (1887) |
| 82. | 2-methyl-quinoxaline | Org. Synth.,30, 86 (1950) |
| 83. | 6-methyl-quinoxaline | Ann.,237, 336 (1887) |
| 84. | 2,3-dimethyl-quinoxaline | Ber., 40, 4852 (1907) |
| 85. | 2-methyl-3-ethyl-quinoxaline | Ber., 22, 526 (1889) |
| 86. | 2-methyl-3-propyl-quinoxaline | J.Chem.Soc., 1946, 54 |
| 87. | 2,3-diethyl-quinoxaline | J.Am.Chem.Soc.,79,1712 (195 |
| 88. | 2-methyl-3-isopropyl-quinoxaline | J.Chem.Soc., 1953, 2822 |
| 89. | 2-methyl-3-butyl-quinoxaline | * |
| 90. | 2-methyl-3-isobutyl-quinoxaline | * |
| 91. | 2-methyl-3-amyl-quinoxaline | J.Chem.Soc., 1943, 322 |
| 92. | 2-ethyl-quinoxaline | J.Chem.Soc., 1953, 2822 |
| 93. | 2-vinyl-pyrazine | J.Org.Chem., 26, 3379 (1961) |
| 94. | 2-isopropenyl-pyrazine | * |
| 95. | 2-methyl-3-vinyl-pyrazine | * |
| 96. | 2-methyl-6-vinyl-pyrazine | * |
| 97. | 2-methyl-5-vinyl-pyrazine | * |

*Spanish patent 326,503

III. Pyrazine carbonyl derivatives

|     |     |     |
| --- | --- | --- |
| 98. | 2-formyl-pyrazine | C.A., 58, 10180b (1963) |
| 99. | 2-acetyl-pyrazine | J.Am.Chem.Soc., 74,3621(1952) |
| 100. | 2-acetonyl-pyrazine | J.Org.Chem.,23, 406 (1958) |

Spanish patent 326,503

The new compounds belonging to group A can be synthesized as following:

16. 2,3-Dimethyl-5-ethyl-pyrzine: This compound has been prepared by addition of an ethyl group in the position 5- of 2,3-dimethylpyrazine according to the procedure described by Klein et al. in J.Am.Chem.Soc., 73, 2949 (1951).

MS: 137 (6.4); 136 (78.1); 135 (100); 134 (3); 121 (2.4); 109 (2.1); 108 (21.7); 107 (1.9); 95 (3); 94 (1.3); 80 (4.1); 69 (1.8); 68 (1.5); 67 (9.4); 66 (1.2); 57 (3.6); 56 (5.7); 55 (3.6); 54 (24.8); 53 (14.2); 52 (6.9); 51 (4.4); 42 (27); 39 (23.3); 27 (14.9).

21. 2-Methyl-5-pyropyl-pyrazine: it has been prepared by alkylation of 2,5-dimethyl-pyrazine according to the synthetic method described by Levine and Behun, J.Org.Chem., 26, 3379 (1961).

MS: 136 (27.3); 135 (10.9); 121 (24.8); 108 (100); 107 (10.6); 39 (23.4); 27 (7.6).

25. 2-Methyl-6-isopropyl-pyrazine: it has been prepared by successively condensing propylene-diamine with isopropyl-glyoxal and catalytically dehydrogenating the obtained 2,3-dihydropyrazine according to the procedure described in Helv.Chem.Acta, 50, 1754 (1967), and finally separating by means of vapour phase chromatography the isomeric mixture of 2-methyl-6-isopropyl-and 2-methyl-5-isopropyl-pyrazine.

MS: 136 (38); 135 (27); 121 (100); 108 (38.6); 94 (10.3); 53 (12.2); 41 (11.4); 39 (21.6); 27 (10.4).

26. Butyl-pyrazine: prepared by alkylating 2-methyl-pyrazine according to the procedure described in J.Org.Chem., 26, 3379 (1961).

MS: 121 (4.3); 107 (13.8); 95 (6.6); 94 (100); 93 (5.4); 67 (4.7); 53 (5.1); 52 (5); 39 (8.7); 27 (7.5).

27. Isobutyl-pyrazine: prepared by alkylating 2-methyl-pyrazine according to the procedure described in J.Org.Chem., 26, 3379 (1961).

MS: 136 (10.3); 121 (17.5); 95 (6.8); 94 (100); 93 (8.1); 67 7.0); 43 (8.9); 39 (11.0); 27 (7.3).

28. [1'-Methyl-propyl]-pyrazine: prepared by alkylating ethyl-pyrazine according to the procedure described in J.Org.Chem., 26, 3379 (1961).

MS: 136 (15.5); 121 (50.4); 108 (100); 107 (52.4); 94 (30.3); 80 (11.1); 79 (12.2); 53 (17.4); 52 (13.2); 39 (10.9); 27 (15.5).

29. tert.-Butyl-pyrazine: prepared by successively condensing ethylene-diamine with tert.-butyl-glyoxal and catalytically dehydrogenating the obtained 2,3-dihydro-pyrazine according to the method described in Helv.Chim.Acta, 50, 1754 (1967).

MS: 136 (24.6); 135 (11.3); 122 (16.4); 121 (100); 107 (20.5); 94 (41); 93 (16); 80 (9.2); 56 (8.5); 53 (13); 52 (10.3); 41 (19.6); 39 (11.7); 27 (9.2).

32. 2-Methyl-5-butyl-pyrazine: prepared by alkylating 2,5-dimethylpyrazine as described in J.Org.Chem., 26, 3379 (1961).

MS: 150 (3.4); 135 (4.6); 121 (12.3); 109 (7.6); 108 (100); 107 (7.9); 80 (4,7); 42 (7.6); 41 (5.6); 39 (14.1); 27 (5.6).

33. 2-Methyl-6-butyl-pyrazine: prepared by alkylating 2,6-dimethylpyrazine according to the procedure described in J.Org.Chem., 26, 3379 (1961).

MS: 150 (2.0); 135 (4.8); 122 (3.2); 121 (12.5); 108 (100); 107 (4.5); 66 (5.6); 42 (5.8); 41 (5.8); 39 (13); 27 (5.6).

35. 2-Methyl-5-isobutyl-pyrazine: prepared by alkylating 2,5-dimethyl-pyrazine according to the procedure described in J.Org.Chem., 26, 3379 (1961).

MS: 150 (15.3); 149 (5.1); 135 (16.8); 109 (7.8); 108 (100); 107 (11.7); 80 (6.2); 43 (7.0); 42 (7.6); 41 (9.2); 39 (17.7); 27 (6.5).

36. 2-Methyl-6-isobutyl-pyrazine: prepared by alkylating 2,6-dimethylpyrazine according to the procedure described in J.Org.Chem., 26, 3379 (1961).

MS: 150 (9.4); 149 (4.6); 136 (15.3); 109 (7.6); 108 (100); 107 (5.6); 66 (6.8); 43 (6.2); 42 (7.9); 41 (8.9); 40 (5.3); 39 (16.7); 27 (5.5).

37. 2-Methyl-3-[1'-methyl-propyl]-pyrazine: prepared by successively condensing ethylene-diamine with 4-methyl-2,3-hexanedione and catalytically dehydrogenating the obtained 2,3-dihydro-pyrazine according to the method described in Helv.Chim.Acta, 50, 1754 (1967).

MS: 150 (2.9); 149 (3.2); 136 (5.1); 135 (53.3); 123 (8.3); 122 (100); 121 (45.2); 108 (37.2); 107 (7.7); 94 (9.7); 93 (14.3); 81 (4.6); 80 (3.0); 67 (13.1); 53 (9.2); 43 (16.4); 42 (16.0); 27 (11.6).

38. 2-Methyl-5-[1'-methyl-propyl]-pyrazine: prepared by successively condensing methyl-3-oxo-pentanal with propylene-diamine and catalytically dehydrogenating the obtained 2,3-dihydro-pyrazine according to the method described in Helv.Chim.Acta, 50, 1754 (1967), and finally separating the isomeric mixture by means of vapour phase chromatography for obtaining 2-methyl-5- and 2-methyl-6-[1'-methyl-propyl]-pyrazine.

MS: 150 (22.2); 149 (4.5); 136 (4.6); 135 (47.4); 123 (8.2); 122 (100); 121 (59.3); 108 (28.0); 107 (8.6); 94 (7.3); 93 (6.5); 81 (1.2); 80 (3.4); 67 (4.8); 53 (10.8); 41 (12.7); 39 (23.0); 27 (13.6).

39. 2-Methyl-6-1'-methyl-propyl]-pyrazine: prepared according to the same method as that described for the obtention of compound 38 hereinabove.

MS: 150 (15.4); 149 (4.8); 136 (4.8); 135 (50.8); 123 (8.5); 122 (100); 121 (51.2); 108 (27.1); 107 (4.8); 94 (7.9); 93 (7.1); 66 (12.4); 53 (12.9); 41 (13.0); 39 (23.0); 27 (14.2).

40. 2-Methyl-3-tert.-butyl-pyrazine: prepared by successively condensing 2,2-dimethyl-3,4-pentanedione with ethylene-diamine and catalytically dehydrogenating the obtained 2,3-dihydro-pyrazine according to the procedure described in Helv.Chim.Acta, 50, 1754 (1967).

MS: 150 (17.2); 149 (15.8); 136 (7.6); 135 (78.4); 109 (8.2); 108 (100); 107 (11.4); 94 (15.5); 93 (13.7); 67 (15.6); 57 (17.2); 53 (10.3); 42 (19.2); 41 (28.0); 40 (7.6); 39 (16.8); 27 (9.7).

41. 2-Methyl-5-tert.-butyl-pyrazine: prepared by successively condensing 3,3-dimethyl-2-oxo-butanal with propylene-diamine and catalytically dehydrogenating the obtained 2,3-dihydro-pyrazine according to the procedure described in Helv.Chim.Acta, 50, 1754 (1967), and finally separating the isomeric mixture of 2-methyl-5- and 2-methyl-6-tert.-butyl-pyrazine by means of vapour phase chromatography.

MS: 150 (30.7); 149 (13.5); 136 (9.4); 135 (100); 108 (48.8); 107 (12.9); 41 (19.5); 39 (19.6); 27 (6).

42. 2-Methyl-6-tert.-butyl-pyrazine: prepared according to the same method as that described hereinabove for 2-methyl-5-tert.-butyl-pyrazine.

MS: 150 (28.5); 149 (18.2); 136 (9.4); 135 (100); 108 (54.4); 107 (5.1); 94 (10.1); 66 (14.5); 41 (20.8); 39 (22.4); 27 (5.8).

43. 2-Ethyl-3-propyl-pyrazine: prepared by successively condensing ethylene-diamine with 3,4-heptanedione and catalytically dehydrogenating the obtained 2,3-dihydro-pyrazine according to the procedure described in Helv.Chim.Acta, 50, 1754 (1967).

MS: 150 (25.3); 149 (6.4); 136 (2.9); 135 (29.4); 123 (8.8); 122 (100); 121 (29.4); 80 (7.5); 67 (9.6); 41 (13.3); 39 (13.0); 38 (1.41); 27 (11.3).

44. 2-Ethyl-5-propyl-pyrazine: prepared by alkylating 2,5-diethylpyrazine according to the method described by Levine and Behun, J.Org.Chem., 26, 3379 (1961), and finally separating by means of vapour phase chromatography the obtained isomeric mixture.

MS: 150 (30.3); 149 (13.3); 136 (3.5); 135 (29.3); 123 (8.5); 122 (100); 121 (12.1); 108 (5.5); 107 (43.0); 54 (5.4); 53 (10.2); 39 (24.0); 27 (12.6).

45. 2-Ethyl-6-propyl-pyrazine: prepared by alkylating 2-methyl-6-ethyl-pyrazine according to the procedure described in J.Org.Chem., 26, 3379 (1961).

MS: 150 (17.3); 149 (13.8); 135 (22.3); 123 (8.6); 122 (100); 107 (10.5); 66 (6.1); 53 (7.6); 39 (16); 27 (8.5).

46. 2-Ethyl-3-isopropyl-pyrazine: prepared by successively condensing ethylene-diamine with 2-methyl-3,4-hexadione and catalytically dehydrogenating the obtained 2,3-dihydro-pyrazine according to the procedure described in Helv.Chim.Acta, 50, 1754 (1967).

MS: 150 (71.3); 149 (18); 136 (12.9); 135 (100); 122 (50); 121 (27.6); 108 (12.2); 107 (16.95); 82 (10.1); 80 (19.1); 54 (12.1); 53 (19.3); 52 (13); 41 (18.6); 39 (16.7); 27 (18.2).

47. 2-Ethyl-5-isopropyl-pyrazine: prepared by alkylating 2,5-diethyl-pyrazine according to the procedure described in J.Org.Chem., 26, 3379 (1961), and finally separating the various obtained isomers by means of vapour phase chromatography.

MS: 150 (35.1); 149 (22.6); 136 (16.2); 135 (100); 122 (32.1); 121 (9.2); 107 (8.7); 53 (14.1); 52 (8); 41 (9.2); 39 (15.4); 27 (13.8).

48. 2-Ethyl-6-isopropyl-pyrazine: prepared by alkylating 2,6-diethyl-pyrazine according to the procedure descried in J.Org.Chem., 26, 3379 (1961).

MS: 150 (35.5); 149 (33.8); 136 (18.8); 135 (100); 108 (11.2); 53 (16.6); 41 (8.7); 39 (16.5); 27 (15.3).

49. 2,6-Dimethyl-3-isopropyl-pyrazine: prepared by successively condensing propylene-diamine with 4-methyl-2,3-pentanedione and catalytically dehydrogenating the obtained 2,3-dihydropyrazine according to the procedure described in Helv. Chim. Acta, 50, 1754 (1967), and finally separating the isomeric mixture of 2,6-dimethyl-3-isopropyl- and 2,5-dimethyl-3-isopropyl-pyrazine by means of vapour phase chromatography.

MS: 151 (4.7); 150 (43.5); 149 (22.8); 136 (10.9); 135 (100); 123 (7.1); 122 (82.2); 108 (11.0); 107 (10.2); 54 (7.0); 43 (12.1); 42 (26.6); 41 (16.3); 40 (10.3); 39 (30.5); 27 (9.5). 50. 2,5-Dimethyl-3-isopropyl-pyrazine: prepared according to the same method as that described for the obtention of 2,6-dimethyl-3-isopropyl-pyrazine.

MS: 151 (4.8); 150 (45.5); 149 (26.5); 136 (14.6); 135 (100); 123 (7.8); 122 (88.2); 108 (21.5); 107 (18.6); 67 (10.6); 43 (10.9); 42 (13.4); 41 (18.2); 40 (12.2); 39 (11.2); 27 (12.4).

51. 2,3-Dimethyl-5-isopropyl-pyrazine: prepared by successively condensing 2,3-diamino-butane with isopropyl-glyoxal and catalytically dehydrogenating the obtained 2,3-dihydro-pyrazine according to the procedure described in Helv.Chim.Acta, 50, 1754 (1967).

MS: 150 (42.0); 149 (27.0); 136 (9.9); 135 (100); 122 (45.9); 108 (7.9); 67 (10.7); 53 (21.6); 52 (9.4); 42 (14.4); 41 (10.0); 39 (13.3) 27 (16.0).

2,6-Dimethyl-3-propyl-pyrazine: prepared by adding a propyl group in the position 3- of 2,6-dimethyl-pyrazine according to the prooocedure described in J.Am.Chem.Soc., 73, 2949 (1951).

MS: 150 (13.5); 149 (7.6); 135 (22.7); 123 (8.4); 122 (100); 121 (8.46); 53 (8.2); 42 (14.5); 39 (17.9); 27 (7.9).

56. 2,5-Dimethyl-3-propyl-pyrazine: prepared according to the procedure described in J.Am.Chem.-Soc., 73, 2949 (1951) by adding a propyl group in the position 3- of 2,5-dimethyl-pyrazine.

MS: 150 (11.4); 149 (7.5); 135 (20.6); 123 (8.4); 122 (100); 121 (8.1); 107 (5.8); 53 (7.6); 42 (17.3); 39 (15.3); 27 (2.5).

57. 2,3-Dimethyl-5-propyl-pyrazine: prepared by adding a propyl group in the position 5- of 2,3-dimethyl-pyrazine according to the same procedure as indicated for compound 56.

MS: 150 (25.1); 149 (11.2); 135 (23); 123 (8.6); 122 (100); 121 (7.2); 80 (8.3); 53 (9.9); 42 (13.2); 39 (17.5); 27 (8.2).

58. Amyl-pyrazine: prepared by alkylating methyl-pyrazine according to the synthetic method described in J.Org.Chem., 26, 3379 (1961).

MS: 150 (2.8); 121 (7); 107 (15.7); 95 (7.2); 94 (100); 93 (4.7); 41 (6.2); 39 (8); 29 (5); 27 (5.8).

59. Isoamyl-pyrazine: prepared by alkylating methyl-pyrazine according to the procedure described in J.Org.Chem., 26, 3379, (1961).

MS: 150 (1.8); 149 (1.8); 135 (8.1); 107 (17.7); 95 (7.2); 94 (100); 93 (4.9); 41 (8); 39 (8.8); 29 (4.5); 27 (6).

60. [2'-Methyl-butyl]-pyrazine: prepared by alkylating methyl-pyrazine according to the method described in J.Org.Chem.,26, 3379 (1961).

MS: 150 (2); 149 (1); 135 (5.1); 121 (7.4); 95 (7); 94 (100); 93 (5.5); 41 (9); 39 (7.2); 29 (8.4); 27 (4.4).

61. [1'-Methyl-butyl]-pyrazine: prepared by successively condensing ethylene-diamine with trimethyl-2-oxo-hexanal and catalytically dehydrogenating the obtained 2,3-dihydro-pyrazine according to the method described in Helv. Chim. Acta, 50, 1754 (1967).

MS: 150 (1.3); 149 (1.1); 135 (6.5); 123 (5); 121 (15.3); 109 (7.3); 108 (100); 107 (37.8); 80 (6.2); 79 (5.7); 53 (9); 52 (7.2); 41 (10.5); 39 (7.3); 29 (3.6); 27 (11.4).

62. [1',2'-Dimethyl-propyl]-pyrazine: prepared by successively condensing ethylene-diamine with 3,4-dimethyl-2-oxo-pentanal and catalytically dehydrogenating the obtained 2,3-dihydro-pyrazine according to the method described for compound 61.

MS: 150 (7.5); 149 (1.7); 135 (27.9); 108 (100); 107 (59.1); 94 (27.5); 80 (9.0); 79 (7.0); 7.0); 53 (10.9); 52 (8.8); 43 (16.7); 41 (13.0); 39 (8.8); 27 (15.1).

63. [1'-Ethyl-propyl]-pyrazine: prepared according to the same procedure as that indicated for compound 62 hereinabove starting from ethylene diamine and 3-ethyl-2-oxo-pentanal.

MS: 150 (17.7); 135 (19.9); 122 (72.9); 121 (68.9); 119 (10); 108 (12.4); 107 (100); 94 (47); 93 (26.5); 79 (9.1); 53 (13.2); 52 (14.1); 41 (22.9); 39 (18.4); 29 (10.1); 27 (17.4).

64. [2',2'-Dimethyl-propyl]-pyrazine: prepared in accordance with the method described for compound 63 starting from ethylenediamine and 4,4-dimethyl-2-oxo-pentanal.

MS: 150 (5.9); 135 (16.0); 95 (6.6); 94 (100); 93 (5.1); 57 (21.3); 41 (17.0); 39 (11.5); b 27 (4.6).

65. [1',1'-Dimethyl-propyl]-pyrazine: prepared by alkylating pyrazine with 2-bromo-(2-methyl)-butyl-lithium according to the procedure described in J.Am.- Chem.Soc., 73, 2949 (1951).

MS: 150 (17.4); 149 (3.1); 136 (5.7); 135 (59.9); 122 (100); 121 (63.7); 108 (14.2); 107 (24.6); 94 (38.6); 93 (21.2); 43 (11.3); 41 (15.6); 39 ; (11.3); 29 (5.5); 27 (9.3).

B. Cyclohexen-2-ones

In this group there are included the compounds belonging to the general formula II. Typical examples of the compounds of class B are:

II.

| | | | |
|---|---|---|---|
| $C_0$ | 1. | cyclohexen-2-one | c.a. |
| | 2. | 2-methyl-cyclohexen-2-one | Ann., 379, 17 (1911) |
| | 3. | 3-methyl-cyclohexen-2-one | c.a. |
| | 4. | 4-methyl-cyclohexen-2-one | J.Chem.Soc., 1960 3563 |
| | 5. | 5-methyl-cyclohexen-2-one | J.Chem.Soc., 1946, 595 |
| | 6. | 6-methyl-cyclohexen-2-one | J.Am.Chem.Soc., 78, 4604 (1956) |
| $C_2$ | 7. | 2,6-dimethyl-cyclohexen-2-one | J.Chem.Soc., 1944, 430 |
| | 8. | 3,4-dimethyl-cyclohexen-2-one | Compt.Rend., 205, 680 (1937) |
| | 9. | 3,5-dimethyl-cyclohexene-2-one | J.Chem.Soc., 1960, 3563 |
| | 10. | 3,6-dimethyl-cyclohexen-2-one | J.Chem.Soc., 1944, 430 |
| | 11. | 4,6-dimethyl-cyclohexen-2-one | J.Chem.Soc., 1944, 430 |
| | 12. | 2,3-dimethyl-cyclohexen-2-one | J.Org.Chem., 4, 266 (1939) |
| | 13. | 2,4-dimethyl-cyclohexen-2-one | C.A., 61, 585c |
| | 14. | 2,5-dimethyl-cyclohexen-2-one | J.Chem.Soc., 1944, 430 |
| | 15. | 4,5-dimethyl-cyclohexen-2-one | C.A., 64, 19436f |
| | 16. | 5,6-dimethyl-cyclohexen-2-one | J.Org.Chem., 21, 612 (1956) |
| | 17. | 2-ethyl-cyclohexen-2-one | Ann., 360, 49 (1908) |
| | 18. | 3-ethyl-cyclohexen-2-one | J.Am.Chem.Soc., 71, 2028 (1949) |
| | 19. | 4-ethyl-cyclohexen-2-one | C.A., 64, 11099 b |
| | 20. | 5-ethyl-cyclohexen-2-one | n.c.,* |
| | 21. | 6-ethyl-cyclohexen-2-one | n.c.,* |

*prepared according to the method described in J.Chem.Soc., 1944, 430.

5-Ethyl-cyclohexen-2-one
MS: 124 (16.8); 69 (3.4); 68 (100); 67 (5.8); 55 (3.8); 41 (7.2); 40 (7.7); 39 (12.0); 27 (4.8). 6-Ethyl-cyclohexen-2-one
MS: 124 (7.1); 96 (46.0); 95 (6.6); 68 (100); 55 (4.9); 41 (6.6); 40 (9.8); 39 (13.7); 27 (8.2).

C. Thiazolidines

Among the compounds belonging to the present group (compounds of formula III) we can mention the following:

III.

| | | | |
|---|---|---|---|
| $C_1$ | 1. | 2-methyl-thiazolidine | b.p. 65–70°/18 Torr |
| $C_2$ | 2. | 2-ethyl-thiazolidine | b.p. 63–4°/12 Torr |
| $C_3$ | 3. | 2-propyl-thiazolidine | b.p. 76–7°/10 Torr |
| | 4. | 2-isopropyl-thiazolidine | n.c., b.p. 72–3°/12 Torr |
| $C_4$ | 5. | 2-butyl-thiazolidine | n.c., b.p. 91–8°/12 Torr |
| | 6. | 2-isobutyl-thiazolidine | b.p. 87–8°/12 Torr |
| | 7. | 2-sec.-butyl-thiazolidine | n.c., b.p. 93–4°/12 Torr |
| | 8. | 2-tert.-butyl-thiazolidine | n.c., b.p. 77–8°/10 Torr |
| $C_5$ | 9. | 2-pentyl-thiazolidine | n.c., b.p. 106–7°/12 Torr |
| | 10. | 2-[1'-methyl-butyl]-thiazolidine | n.c., b.p. 104–6°/10 Torr |
| | 11. | 2-[1'-ethyl-propyl]-thiazolidine | n.c., b.p. 102–3°/12 Torr |
| $C_6$ | 12. | 2-hexyl-thiazolidine | b.p. 123–4°/12 Torr |
| $C_7$ | 13. | 2-[o-methoxy-phenyl]-thiazolidine | n.c., b.p. 113–6°/12 Torr |

The boiling points indicated in the hereinabove list are given in degrees centigrade.

The compounds mentioned above have been prepared according to a synthetic method analogous to that indicated hereinbelow for the preparation of 2-propyl-thiazolidine:

102 g of n-butyraldehyde (1.42 Mole) were added under stirring to 91 g (1.18 Mole) of cisteamine in 190 ml of water. The reaction was slightly exothermic and the temperature of the reaction mixture raised to approximately 60° C. The reaction mixture was kept under stirring for five more hours and extracted then with 2 portions of 500 ml of ether. After the usual treatment of separation, washing with water and drying over sodium sulfate, the organic extracts were evaporated to dryness and the obtained residue was distilled under reduced pressure to give 2-propyl-thiazolidine, b.p. 75°–8°/10 Torr; 126 g; yield 82 %. A portion of the obtained product was subjected to a fractional distillation, b.p. 76°–7°/10 Torr.

The invention is better illustrated by the following examples:

EXAMPLE 1

A base flavouring composition has been prepared by admixing the following ingredients (parts by weight):

| | |
|---|---|
| 2-methyl-pyrazine | 5.0 |
| 2,5-dimethyl-pyrazine | 8.0 |
| 2-methyl-6-ethyl-pyrazine | 1.0 |
| 2-methyl-3-ethyl-pyrazine | 2.5 |
| 3,5-dimethyl-2-ethyl-pyrazine | 1.0 |
| 2,5-dimethyl-3-ethyl-pyrazine | 2.0 |
| propylene glycol | 980.5 |
| | 1,000.0 |

The above indicated base composition was added in the proportion of 0.01 % to a solution at 0.5 % (weight/volume) of sodium in water and separately to a solution at 1 % (volume/volume) of a commercially available proteins hydrolysate in water. The solutions thus obtained were respectively divided into four parts of equal volume. This fractions were then flavoured by adding the following ingredients (parts by weight based on the total weight of the solution).

| | |
|---|---|
| 1. 5-methyl-2-cyclohexen-1-one | 5 ppm |
| 2. 6-methyl-2-cyclohexen-1-one | 5 ppm |
| 3. 3,6-dimethyl-2-cyclohexen-1-one | 5 ppm |
| 4. 4,6-dimethyl-2-cyclohexen-1-one | 5 ppm |

The flavoured solutions thus obtained were subjected to an organoleptic evaluation by a group of trained tasters, who have defined the taste of the solutions as follows:
1. Green hazelnuts
2. Meat character
3. Burned, roasted meat character, slightly earthy
4. Analogous to that indicated sub 3.

EXAMPLE 2

A base flavouring composition was prepared by admixing the following ingredients (parts by weight):

| | |
|---|---|
| 2-methyl-pyrazine | 5.0 |
| 2,5-dimethyl-pyrazine | 8.0 |
| 2-methyl-6-ethyl-pyrazine | 1.0 |
| 2-methyl-3-ethyl-pyrazine | 2.5 |
| 3,5-dimethyl-2-ethyl-pyrazine | 1.0 |
| 2,5-dimethyl-3-ethyl-pyrazine | 2.0 |
| propylene-glycol | 980.5 |
| | 1,000.0 |

The above indicated base composition was added in the proportion of 0.01 % to a solution at 0.5 % (weight/volume) of sodium chloride in water (solution A) and to a solution of 1 % (volume/volume) of a commercially available vegetal proteins hydrolysate in water (solution B). The solutions thus obtained were respectively divided into four parts of equal volume. These fractions were then flavoured by adding the following ingredients (parts by weight based on the total weight of the solution):

| | |
|---|---|
| 1. 2-n-propyl-thiazolidine | 5 ppm |
| 2. 2-isopropyl-thiazolidine | 5 ppm |
| 3. 2-n-butyl-thiazolidine | 5 ppm |
| 4. 2-isobutyl-thiazolidine | 5 ppm |

The flavour solutions thus obtained were subjected to an organoleptic evaluation by a group of trained tasters, who have defined the taste of the solutions as follows:
1. Meat, nut, coffee character
2. Sulfury note, meaty after-taste
3. Cereal character, meaty or hazelnut after-taste
4. Chocolate, cocoa, note.

EXAMPLE 3

A base flavouring composition prepared by admixing the same ingredients as those indicated in Examples 1 and 2, was added to a solution of 0.5 % (weight/volume) of sodium chloride in water (solution A) and to a solution of 1 % (volume/volume) of a commercially available vegetal proteins hydrolysate in water (solution B).

1.1. By adding to above indicated solution A 5 ppm of 2-n-propyl-thiazolidine and 2.5 ppm of 3,6-dimethyl-2-cyclohexen-1-one there is obtained a solution which shows a taste reminiscent of fried potatoes and vaguely of meat.

1.2. By adding to solution B 5 ppm, based on the total weight of the solution to be flavoured, of 2-n-propyl-thiazolidine and 2.5 ppm of 3,6-dimethyl-2-chclohexen-1-one there is obtained a solution possessing a taste reminiscent of roast beef.

1.3. By adding to solution B 5 ppm of 2-n-propyl-thiazolidine and 2.5ppm of 4,6-dimethyl-2-cyclohexen-1-one there is obtained a solution possessing a taste of meat presenting a burned note as well.

2.1. By adding to solution A 5 ppm of 2-n-butyl-thiazolidine and 2.5 ppm of 3,6-dimethyl-2-cyclohexen-1-one there is obtained a solution having a taste reminiscent of fried potatoes. When the same ingredients were added to solution B, there is obtained a solution possessing the taste of beef meat.

2.2. An analogous effect has been obtained by adding to solution B 5 ppm of 2-n-butyl-thiazolidine and 2.5 ppm of 4,6-dimethyl-2-cyclohexen-1-one.

3.1. By adding to solution B 5 ppm of 2-isopropyl-thiazolidine and 1.5 ppm of 3,6-dimethyl-2-cyclohexen-1-one there is obtained a solution possessing a meaty taste.

3.2. By adding to solution B 5 ppm of 2-isopropyl-thiazolidine and 2.5 ppm of 3,6-dimethyl-2-cyclohexen-1-one there is obtained a solution having a very interesting note of roast beef.

3.3. The same effect as that observed in paragraph 3.2. is obtained by adding to solution B 5 ppm of 2-iso-propyl-thiazolidine and 2.5 ppm of 4,6-dimethyl-2-cyclohnexen-1-one.

EXAMPLE 4

A base flavouring composition was prepared by admixing the following ingredients (parts by weight):

| | |
|---|---:|
| 2-methyl-pyrazine | 5.0 |
| 2,5-dimethyl-pyrazine | 8.0 |
| 2,6-dimethyl-pyrazine | 15.0 |
| 2-methyl-6-ethyl-pyrazine | 1.0 |
| 2-methyl-3-ethyl-pyrazine | 2.5 |
| 3,5-dimethyl-2-ethyl-pyrazine | 1.0 |
| 2,5-dimethyl-3-ethyl-pyrazine | 2.0 |
| 2,6-dimethyl-3,5-diethyl-pyrazine | 1.0 |
| propylene glycol | 964.5 |
| | 1,000.0 |

The base composition indicated above was added in the proportion of 0.01 % to a solution at 15 % of sucrose in water. By adding to the solution thus obtained 20 ppm of vanillin, 1 ppm of α-methylbutyraldehyde and 5 ppm of 2-isobutyl-thiazolidine there is obtained a solution having a very interesting burned chocolate taste and possessing as well a nutty after-taste.

EXAMPLE 5

A base flavouring composition was prepared by admixing the following ingredients (parts by weight):

| | |
|---|---:|
| dimethyl sulphide | 0.03 |
| 2-methyl-3-ethyl-pyrazine | 0.15 |
| 2-acetyl-pyrazine | 0.20 |
| 2-ethyl-6-methyl-pyrazine | 0.20 |
| indole | 0.20 |
| 2,5-dimethyl-3-ethyl-pyrazine | 0.30 |
| 2,3,5-trimethyl-pyrazine | 0.50 |
| 2,5-dimethyl-pyrazine | 0.50 |
| capric acid | 1.00 |
| caprylic acid | 2.00 |
| n-butyric acid | 2.00 |
| caproic acid | 3.50 |
| vegetable oil | 89.42 |
| | 100.00 |

The above indicated base composition was added in the proportion of 0.01 % to a solution of 25 g of commercially available gravy mix in 600 ml of water. This solution represents the control solution. Said solution was then divided into four parts of equal volume and these fractions were then flavoured by adding the following ingredients in the amount indicated (parts by weight based on the total weight of the solution):

| | | |
|---|---|---|
| 1. 2-n-propyl-thiazolidine | 5 ppm | |
| 2. 2-isopropyl-thiazolidine | 5 ppm | |
| 3. 2-n-butyl-thiazolidine | 5 ppm | |

The flavoured solutions thus obtained were subjected to an organoleptic evaluation by a group of trained tasters who defined their taste as follows:
1. Possessed a more defined meaty character than the control solution, particularly in the fatty and charred note.
2. Strong burnt, charred character
3. Analogous to 2, but with stronger beef fat note.

EXAMPLE 6

A base flavouring composition was prepared by admixing the following ingredients (parts by weight):

| | |
|---|---:|
| dimethyl sulphide | 0.03 |
| 2-methyl-3-ethyl-pyrazine | 0.15 |
| 2-acetyl-pyrazine | 0.20 |
| 2-ethyl-6-methyl-pyrazine | 0.20 |
| indole | 0.20 |
| 2,5-dimethyl-3-ethyl-pyrazine | 0.30 |
| 2,3,5-trimethyl-pyrazine | 0.50 |
| 2,5-dimethyl-pyrazine | 0.50 |
| capric acid | 1.00 |
| caprylic acid | 2.00 |
| n-butyric acid | 2.00 |
| caproic acid | 3.50 |
| vegetable oil | 89.42 |
| | 100.00 |

The above indicated base composition was added in the proportion of 0.01 % to a solution of 25 g of commercially available gravy mix in 600 ml of water. The solution thus obtained was divided into two parts of equal volume and these fractions were then flavoured by adding the following ingredients in the amount indicated (parts by weight based on the total weight of the solution):

| | |
|---|---|
| 1. 6-methyl-2-cyclohexenone | 5 ppm |
| 2. 4,5-dimethyl-2-cyclohexenone | 5 ppm |

The flavoured solutions thus obtained were subjected to an organoleptic evaluation by a panel of trained tasters who defined their taste as follows:
1. Possessed a roasted cereal note. Said note was absent in the control solution.
2. Cereal note, meat character, rounder taste than 1.

Two aliquotes of solutions flavoured in the same way as described hereinabove by adding in the proportion of 0.01 % the base flavouring composition were further flavoured with:

| | | |
|---|---|---|
| 1. | 2-isopropyl-thiazolidine | 2.5 ppm |
| | 4,6-dimethyl-2-cyclohexenone | 5.0 ppm |
| 2. | 2-n-butyl-thiazolidine | 5.0 ppm |
| | 4,6-dimethyl-2-cyclohexenone | 5.0 ppm |

In the opinion of the panel the solutions flavoured with 1. and 2. were fuller and rounder in flavour with enhanced roasted meaty note when compared to the control solution.

EXAMPLE 7

A flavour base composition of the chocolate type was prepared by admixing the following ingredients (parts by weight):

| | |
|---|---:|
| acetic acid | 0.50 |
| isobutyraldehyde | 0.50 |
| 2-methylbutyric acid | 1.00 |
| isovaleraldehyde | 1.50 |
| caproic acid | 1.50 |
| 2-methylbutanal | 1.50 |
| furfuryl alcohol | 2.00 |
| vanillin | 10.00 |
| propylene glycol | 81.50 |
| | 100.00 |

A: Chocolate milk drinks

A commercial chocolate instant milk drink powder containing cocoa powder, milk powder and sugar was used as a base. 100 g of said base were dissolved in 600 ml of cold water. The solution was then divided into three fractions of equal volume. One of these fractions was used as a control solution whereas the two others were separately flavoured by
1. adding 0.005 % of the base solution as indicated above and 0.005 % (based on the total weight of the flavoured solution) of the pyrazinic base flavouring composition indicted in Example 4, and
2. adding 0.005 % of the base solution as indicated above, 0.005 % of the pyrazinic base flavouring composition indicated in Example 4 and 1.5 ppm of 2-isobutyl-thiazolidine.

It was the opinion of the evaluation panel that the addition of 2-isobutyl-thiazolidine promoted an enhancement to the chocolate note of the solution. Said solution possessed as well a more rounded flavour.

B: Chocolate bars

A low grade commercial chocolate converture was used as material to be flavoured. The same flavouring compositions as those indicated for carrying out the aromatization of the chocolate milk drinks of the paragraph A hereinabove were used. Also in this case the panelists found that the chocolate bars flavoured with the flavouring composition prepared according to 2. of paragraph A possessed a better defined chocolate character and a fuller and rounder flavour note than the base unflavoured material.

I claim:

1. A process for improving, enhancing or modifying the organoleptic properties of foodstuffs, feedstuffs, beverages, pharmaceutical preparations and tobacco products which comprises adding thereto a small but effective amount of a flavouring composition comprising at least one compound having the formula

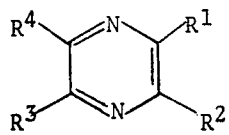

I wherein (1) the substituents $R^1$, $R^2$, $R^3$ and $R^4$ each represent a hydrogen atom, an aliphatic hydrocarbon radical, or a cyclic hydrocarbon radical; (2) $R^3$ and $R^4$ together represent a benzene ring and $R^1$ and $R^2$ are as defined in sub (1); or (3) one of the radicals $R^1$, $R^2$, $R^3$ and $R^4$ represents an acyl radical and each of the other radicals is as defined in sub (1); at least one compound of formula

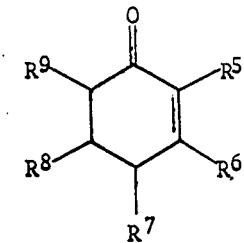

II wherein the substituents $R^5$, $R^6$, $R^7$, $R^8$ and $R^9$ each represent a hydrogen atom, an aliphatic hyrocarbon radical, or a cyclic hydrocarbon radical; and at least one compound of formula

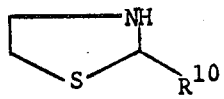

III wherein $R^{10}$ represents a hydrogen atom, an aliphatic hydrocarbon radical, a cyclic hydrocarbon radical, or an aromatic or araliphatic hydrocarbon radical.

2. A process for improving, enhancing or modifying the oranoleptic properties of foodstuffs, feedstuffs, beverages, pharmaceutical preparations and tobacco products which comprises adding thereto a small but effective amount of at least one compound having the formula II, as set forth in claim 1, and at least one compound of formula III, as set forth in claim 1.

3. A process for improving, enhancing or modifying the organoleptic properties of foodstuffs, feedstuffs, beverages, pharmaceutical preparations and tobacco products wich comprises adding thereto a small but effective amount of a flavouring composition comprising at least one compound having the formula I, as set forth in claim 1, and at least one compound of formula II, as set forth in claim 1.

4. A process for improving, enhancing or modifying the organoleptic properties of foodstuffs, feedstuffs, beverages, pharmaceutical preparations and tobacco products which comprises adding thereto a small but effective amount of a flavouring composition comprising at least one compound having the formula II, as set forth in claim 1.

5. Flavouring composition which comprises at least one compound of formula II, as set forth in claim 1, and at least one compound of formula II, as set forth in claim 1.

6. A foodstuff having added thereto a small but flavour-modifying quantity of the composition as set forth in claim 4.

7. A foodstuff according to claim 6 having added thereto betweeen about 0.1 and about 10 ppm by weight of the flavouring composition.

8. Flavouring composition which comprises at least one compound having the formula I, as set forth in claim 1, and at least one compound of formula II, as set forth in claim 1.

9. A foodstuff having added thereto a small but flavour-modifying quantity of the composition as set forth in claim 8.

10. A foodstuff according to claim 9 having added thereto between about 0.1 and about 10 ppm by weight of the flavouring composition.

11. Flavouring composition which comprises at least one compound of formula II, as set forth in claim 1.

12. A foodstuff having added thereto a small but flavour-modifying quantity of the composition as set forth in claim 1.

13. A foodstuff according to claim 12 having added thereto between about 0.1 and about 10 ppm by weight of flavouring composition.

14. Flavouring composition which comprises at least one compound having the formula I, as set forth in claim 1, at least one compound of formula II, as set forth in claim 1, and at least one compound of formula III, as set forth in claim 1.

15. A foodstuff having added thereto a small but flavour-modifying quantity of the composition as set forth in claim 14.

16. A foodstuff according to claim 15 having added thereto between about 0.1 and about 10 ppm by weight of the flavouring composition.

* * * * *

UNITED STATES PATENT AND TRADEMARK OFFICE
CERTIFICATE OF CORRECTION

PATENT NO. : 3,881,025
DATED : April 29, 1975
INVENTOR(S) : Ivon Flament

It is certified that error appears in the above-identified patent and that said Letters Patent are hereby corrected as shown below:

1. In Column 1, line 57 "seveal" should be --several--.

2. In Column 1, line 62 "(1965" should be --(1965)--.

3. In Column 2, line 59 "reprsents a represents atom" should be --represents a hydrogen atom--.

4. In Column 2, line 66 "diffeent" should be --different--.

5. In Column 2, line 67, "different by the sum" should be --expected by the sum--.

6. In Column 4, line 7 "at least 1" should be --at least about 1--.

7. In Column 4, line 19 "source of" should be --source or--.

8. In Column 4, in Formula I "30. 2,3,6-trimethyl-5-ethyl-pyrazine" should be --30. 2,3,6-trimethyl-5-ethyl-pyrazine **--.

9. In Column 8, line 42 "2-Methyl-6-1'-methyl-propyl]-pyrazine:" should be --2-Methyl-6-[1'-methyl-propyl]-pyrazine:--.

10. In Column 10, line 2 "50. 2,5-Dimethyl-3-" should have started as a new paragraph.

11. In Column 10, line 18 "2,6-Dimethyl-3-propyl-pyrazine: prepared by adding" should be --55. 2,6-Dimethyl-3-propyl-pyrazine: prepared by adding--.

12. In Column 10, line 20 "proocedure" should be --procedure--.

UNITED STATES PATENT AND TRADEMARK OFFICE
CERTIFICATE OF CORRECTION

PATENT NO. : 3,881,025

DATED : April 29, 1975

INVENTOR(S) : Ivon Flament

Page - 2

It is certified that error appears in the above-identified patent and that said Letters Patent are hereby corrected as shown below:

13. In Column 11, line 4 "79 (7.0);7.0); 53" should be --79 (7.0); 53--.

14. In Column 11, line 62 "39 (11.5); b 27 (4.6)." should be --39 (11.5); 27 (4.6).--.

15. In Column 12, line 45 "hiazoli-dine" should be --thiazoli-dine--.

16. In Column 13, line 32 "sodium in water" should be --sodium chloride in water--.

17. In Column 14, line 40 "chclohexen-1-one" should be --cyclohexen-1-one--.

18. In Column 14, line 68 "cyclohnexen-1-one." should be --cyclohexen-1-one.--.

19. In Column 17, line 12 "converture" should be --coverture--.

20. In Column 18, line 5, claim 2, "oranoleptic properties" should be --organoleptic properties--.

21. In Column 18, line 14, claim 3, "wich" should be --which--.

22. In Column 18, line 28, claim 5, "formula II" should be --formula III--.

Signed and Sealed this second Day of December 1975

[SEAL]

Attest:

RUTH C. MASON
*Attesting Officer*

C. MARSHALL DANN
*Commissioner of Patents and Trademarks*